United States Patent
Takagimi et al.

(10) Patent No.: US 7,253,129 B2
(45) Date of Patent: Aug. 7, 2007

(54) RARE EARTH GARMET SINTERED COMPACT

(75) Inventors: Yanagitani Takagimi, Kagawa (JP); Yagi Hideki, Kagawa (JP)

(73) Assignee: Konoshima Chemical Co., Ltd., Chuo-Ku, Osaka-Shi, Osaka (JP)

( * ) Notice: Subject to any disclaimer, the term of this patent is extended or adjusted under 35 U.S.C. 154(b) by 362 days.

(21) Appl. No.: 10/525,162

(22) PCT Filed: Jan. 27, 2003

(86) PCT No.: PCT/JP03/00750

§ 371 (c)(1),
(2), (4) Date: Feb. 22, 2005

(87) PCT Pub. No.: WO2004/067474

PCT Pub. Date: Aug. 12, 2004

(65) Prior Publication Data

US 2005/0215419 A1    Sep. 29, 2005

(51) Int. Cl.
*C04B 35/50* (2006.01)
*C04B 35/64* (2006.01)

(52) U.S. Cl. .............. 501/152; 501/127; 501/153; 423/263; 264/663; 264/674; 264/681

(58) Field of Classification Search ............... 501/152, 501/127, 153; 423/263; 264/663, 674, 681
See application file for complete search history.

(56) References Cited

U.S. PATENT DOCUMENTS

| | | | |
|---|---|---|---|
| 5,075,267 A | 12/1991 | Fujii et al. | |
| 5,484,750 A * | 1/1996 | Greskovich et al. | 501/86 |
| 6,844,285 B1 * | 1/2005 | Wei | 501/152 |
| 2004/0109808 A1 * | 6/2004 | Lee et al. | 423/263 |
| 2005/0019241 A1 * | 1/2005 | Lyons | 423/263 |

FOREIGN PATENT DOCUMENTS

| | | | |
|---|---|---|---|
| JP | 03275560 A | * | 12/1991 |
| JP | 03275561 A | * | 12/1991 |
| JP | 04202051 A | * | 7/1992 |
| JP | 11-130428 A | | 5/1999 |
| JP | 2000302543 A | * | 10/2000 |
| JP | 2001-89225 A | | 4/2001 |
| JP | 2001-158620 A | | 6/2001 |
| JP | 2001-158660 A | | 6/2001 |

\* cited by examiner

*Primary Examiner*—David Sample
(74) *Attorney, Agent, or Firm*—The Webb Law Firm

(57) ABSTRACT

A rare earth garnet sintered compact which is produced by subjecting a rare earth garnet powder such as YAG to a pre-sintering, sintering the pre-sintered product by HIP, and annealing the sintered product at 1100° C. to 1600° C. in a whole oxygen atmosphere under a whole pressure of 4.5 MPa or more, and has an average crystallite diameter of 0.9 to 9 μm, an optical loss coefficient of 0.002 cm$^{-1}$ or less and a strain of a transmitted wave of 0.05 λ cm$^{-1}$ or less.

4 Claims, 2 Drawing Sheets

RARE EARTH GARMET SINTERED COMPACT

TECHNICAL FIELD

This invention relates to a sintered compact of a polycrystalline rare earth garnet, which is used as a laser material such as YAG laser and an optical material such as a mirror and a prism, and a manufacturing method thereof. YAG is an abbreviation of yttrium aluminum garnet having a composition of $Y_3Al_5O_{12}$.

TECHNICAL BACKGROUND

It was proposed to use a polycrystalline sintered compact such as YAG as an optical material for a scintillator. For example, Greskovich et al. (U.S. Pat. No. 5,013,696) disclosed presintering a rare earth oxide mold, which has the composition of 67 mol % $Y_2O_3$, 3 mol % $Eu_2O_3$, and 30 mol % $Gd_2O_3$, in a hydrogen atmosphere at 1625 deg C. for 4 hours followed by HIP (hot isostatic pressing) at 1650 deg C. for 1 hour in an Ar atmosphere of 170 MPa and finally, re-sintering at 1850 deg C. for 2 hours in a wet hydrogen atmosphere (U.S. Pat. No. 5,013,696).

The rare earth oxide sintered compact obtained by presintering has a density ranging from 97% to 99% of a theoretical density and the sintered compact subjected to HIP becomes more compact to reduce the number of pores. The sintered compact subjected to HIP shows not prominent increase of an average crystallite diameter as reported in that the average crystal crystallite diameter after HIP ranges from 2 to 4 μm. Resintering increases the average crystallite diameter of the sintered compact to 25 or more micrometers and squeezes bubbles by using grain growth and clearness of the sintered compact increases. The sintered compact after resintering was reported as having the light loss coefficient of 2.93 $cm^{-1}$.

Ikesue et al. (J. Am. Ceram. Soc. 79 [7]: 1927-1933. (1996)) reported manufacture of a YAG sintered compact added with Nd. The YAG sintered compact was presintered at 1600 deg C. for 3 hours in a vacuum, subjected to HIP at 1500 to 1700 deg C. for 3 hours under 9.8 or 196 MPa, and finally, resintered at 1750 deg C. for 20 hours in the vacuum. YAG receives $SiO_2$ as an additive for sintering and shows 50 or more micrometers of the average crystallite diameter of the sintered compact by resintering after HIP. They also reported that resintering generates pores, which derived seemingly from Ar of HIP.

In these conventional techniques, resintering at a higher temperature than that of HIP is used for removing pores by increasing the crystallite diameter of the sintered compact. By this way, when a grain boundary moves during grain growth, pores move according to the moved grain boundary to allow pores to move to a surface of the sintered compact. However, as well known, an increase in the crystallite diameter decreases strength of the sintered compact and lowers processability. In addition, the light loss coefficient of 2.93 $cm^{-1}$ of the sintered compact of Greskovich et al. is enough for the scintillator, but not enough as the laser material. Ikesue et al. reported that it is difficult to remove pores completely by resintering and, rather, pores are generated during resintering. Pores in the sintered compact cause light scattering and, therefore, the sintered compact containing pores is inappropriate for the laser material.

Next, in the case where a ceramic sintered compact is used as the laser material, there is an advantage in making a transmitting wave front distortion smaller. The transmitting wave front distortion is a quantity expressing unevenness of a wave front when a monochromatic light having an even phase is passed through the laser material. The transmitting wave front distortion may be caused by transformation of a crystal. Therefore, in case of the ceramic sintered compact having a smaller crystallite diameter than that of a single crystal, it is possible to eliminate transformation by escaping it to the grain boundary to make the transmitting wave front distortion smaller. In case of the single crystal, the transmitting wave front distortion is about 0.1 λ.

SUMMARY OF THE INVENTION

The object of the present invention is to provide a polycrystalline garnet sintered compact, which has a small optical loss, a small transmitting wave front distortion, and a high processibility, and a manufacturing method thereof.

Rare earth garnet sintered compact according to the present invention is annealed in a pressurized oxygen-containing atmosphere after hot isostatic pressing (HIP) and has the average crystallite diameter ranging from 0.9 to 9 μm, the light loss coefficient of 0.002 or smaller $cm^{-1}$, and the transmitting wave front distortion of 0.05 or smaller λ $cm^{-1}$.

In the method for manufacturing the rare earth garnet sintered compact according to the present invention, a mold of a rare earth garnet powder is presintered, the obtained presintered compact is prepared as an HIP presintered compact by hot isostatic pressing (HIP,) and the obtained HIP presintered compact is annealed in the oxygen-containing atmosphere pressurized under 4.5 or higher MPa and at a temperature of a temperature, for example, used for HIP or lower. By this way, the sintered compact is yielded having the average crystallite diameter ranging from 0.9 to 9 μm, the light loss coefficient of 0.002 or smaller $cm^{-1}$, and the transmitting wave front distortion of 0.05 or smaller λ $cm^{-1}$.

Preferably, an oxygen partial pressure of the oxygen-containing atmosphere is 900 or higher KPa in annealing.

More preferably, the temperature in annealing is 1100 to 1600 deg C., and most preferably, 1100 to 1550 deg C., a full pressure of the oxygen-containing atmosphere is 4.5 or higher MPa in annealing, and the HIP temperature is 1600 or higher deg C.

Where, the rare earth includes elements from La of the atomic number 57 to Lu of the atomic number 71 and if garnet is expressed $A_3B_5O_{12}$, element B is a trivalent metal such as Al, Ga, and the like and element A is at least a part thereof, for example, 50 or higher atm % is the rare earth.

According to the present invention, the garnet sintered compact subjected to presintering and HIP is annealing in the pressurized oxygen-containing atmosphere. This annealing may be called resintering. The garnet sintered compact after HIP is normally colored. However, coloration disappears by oxidization (hereafter reoxidization) of the sintered compact through annealing in the oxygen-containing atmosphere. When elements (for example, Er, Ho, and the like) originally having coloration are used, it has been widely known by those skilled in the art that the coloration is maintained. The oxygen partial pressure used at annealing is, for example, 900 KPa (8.9 atm) or higher and the sintered compact is enough reoxidized by annealing under a high oxygen partial pressure to make the light loss small. Annealing is carried out at, for example, the HIP temperature or lower and, thus, an increase in the crystallite diameter during an annealing process can be neglected. And, HIP yields the sintered compact having the average crystallite diameter 9 or smaller micrometers. Therefore, the sintered compact having a relatively small average crystallite diameter ranging from 0.9 to 9 μm can be yielded to prevent lowering the strength of the sintered compact by grain growth resulting in also preventing lowering processibility of the sintered compact.

Annealing is operated in a pressurized atmosphere, for example, the full pressure at annealing is made 4.5 MPa. In this way, pores are prevented to generate at annealing. A process generating pores at annealing may be because a lattice of a crystallite of the sintered compact is loosened by heating at annealing to generate pores made by atoms such as Ar, which has made a solid solution in the crystallite. Therefore, annealing under pressurization makes pores unstable to prevent to generate pores. In other words, a pressure breaks pores.

According to experiences of the present inventors, there are 2 approaches of making the light loss of the rare earth garnet sintered compact small. The one approach is resintering at the high temperature after HIP to squeeze pores by using grain growth and making solid solution of impurities in the crystallite by this resintering at the high temperature. In this way, the average crystallite diameter of the sintered compact suitable for laser material becomes, for example, 30 or larger micrometers.

The other approach is to operate annealing at the temperature of the HIP temperature or lower under pressurization after HIP to prevent to generate pores by the pressure resulting in yielding the sintered compact having the small average crystallite diameter. In this case, it is suitable to make the average crystallite diameter of the sintered compact in the range from 0.9 to 9 μm. It is presumed that annealing under pressurization prevents to precipitate impurities in the grain boundary resulting in preventing the light loss caused by the impurities. Precipitation of impurities may make the light loss coefficient in a large value. However, annealing under pressurization can yield the light loss of 0.002 or smaller $cm^{-1}$. If the impurities are precipitated, such the small light loss coefficient never occurs. Thus, it is presumed that annealing under pressurization provides an effect of preventing precipitation of impurities in the grain boundary.

Next, according to findings of the present inventors, the sintered compact, which has the small average crystallite diameter, obtained by annealing under pressurization provides a small transmitting wave front distortion and the sintered compact obtained by resintering at the higher temperature than HIP temperature shows a large transmitting wave front distortion. A cause of the transmitting wave front distortion may be transformation of crystallite and if transformation develops to the grain boundary, transformation disappears. Therefore, suppressing the increase in the average crystallite diameter can decrease transformation. According to findings of the present inventors, there is a region where the average crystallite diameter becomes 9 or smaller micrometers or 30 or larger micrometers and the transmitting wave front distortion becomes 0.05 λ $cm^{-1}$ and, in the region ranging from 10 to 20 μm of the average crystallite diameter between these ranges, the transmitting wave front distortion exceeds 0.05 λ $cm^{-1}$. As described above, the transmitting wave front distortion is not simply reduced by reduction of the average crystallite diameter and, thus, dependence of the transmitting wave front distortion on the average crystallite diameter is complicated.

The laser material, namely, the material for laser oscillation is exemplified by YAG prepared by adding Nd, Er, Cr, Tm, Ho, Yb, and the like such disorder crystals as $(Y_{1.5}Gd_{1.5})Al_5O_{12}$ and $Gd_3Ga_5O_{12}$ or the like may be used. On the other hand, YAG, $Lu_3Al_5O_{12}$, $Yb_3Al_5O_{12}$, and the like, which are added with an activated ion, are used as the material of colorless clear lens, mirror, prism, and the like. An aid such as $SiO_2$ and CaO, MgO, and the like for sintering may be added.

EMBODIMENT

Material Powder

Figure 1:
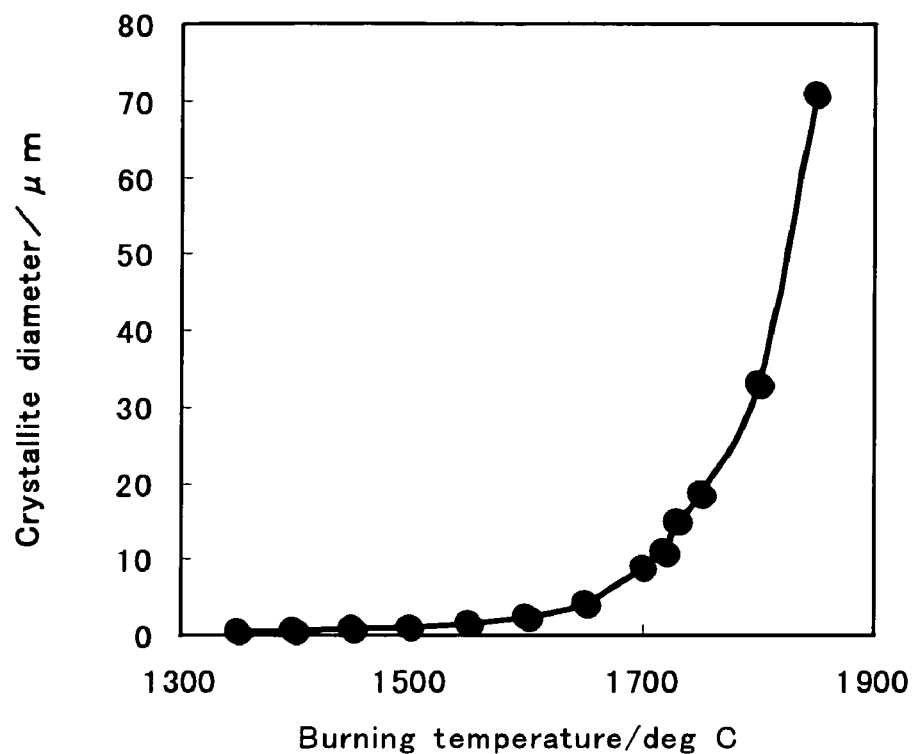
FIG. 1 is a figure a showing characteristic of an average crystallite diameter of a sintered compact prepared by subjecting a preliminary sintered compact to HIP processing at a temperature ranging from 1350 deg C. to 1850 deg C. for 5 hours in 147 MPa Ar.

Fifteen liter of 0.5 mol/liter high purity yttrium chloride aqueous solution is blended with 25 liter of 0.5 mol/liter high purity aluminum chloride aqueous solution to make a mixture solution of YAG composition. The mixture solution of YAG composition was dripped into 40 liter of 2 mol/liter ammonium hydrogen carbonate aqueous solution, of which an ammonium water was used for adjusting the pH to 8.2, in a rate of 1.5 liter/minute. At this time, both of the mixture solution of YAG composition and the ammonium hydrogen carbonate aqueous solution were kept at 32 deg C. A minimum value of pH during dripping was 7.0, and pH reached 7.95 being a constant value about 3 hours after dripping. Following dripping the mixture solution was cured at 32 deg C. for 48 hours and, then, filtration and washing were repeated 6 times resulting in yielding a YAG precursor. The obtained YAG precursor was subjected to burning at 1200 deg C. for 5 hours in air and pulverized to prepare a material powder. A BET area/weight ratio value of this powder was 14.6 $m^2/g$ and the average grain diameter (secondary grain diameter) measured by the laser scattering method was 0.22 μm. On the other hand, aggregated grains having diameter of 2 or larger μm were not observed.

Molding

An organic aid such as dispersant was dispersed in a given amount of alcohol, the material powder was added to mix for about 20 hours by using a nylon pot and a nylon bowl. The obtained slurry was subjected to deaeration processing for about 30 minutes by using a vacuum deaerator, injected into a gypsum mold by a pressurizing casting molding apparatus at a pressure of about 490 KPa (about 5 kgf/$cm^2$) to prepare a molded compact having a size of 50×250×15 mm.

Pre-Sintering

The molded compact obtained was dried enough at an ordinary temperature and degreased at 750 deg C. for 100 hours in an oxygen stream in a temperature-rising rate: 30 deg C./hr. A density of the molded compact after degreasing was 61.5 percents in comparison with a theoretical density.

The molded compact was presintered at a temperature of 1500 deg C. for 2 hours in a temperature-rising rate: 400 deg C./hr and a vacuum degree: $10^{-3}$ or lower Torr. The density of the obtained presintered compact was 99.4 percents through measurement using the Archimedes' method in comparison with a theoretical density. Observation of a sectioned face of the sintered compact by using a scanning electron microscope showed the average crystallite diameter of 0.5 μm. Presintering was operated in a reduced atmosphere or a vacuum and, if operated in the oxygen atmosphere, even HIP and annealing were carried out in the same ways described in the examples, the sintered compact showed a large light loss.

HIP

Figure 2:
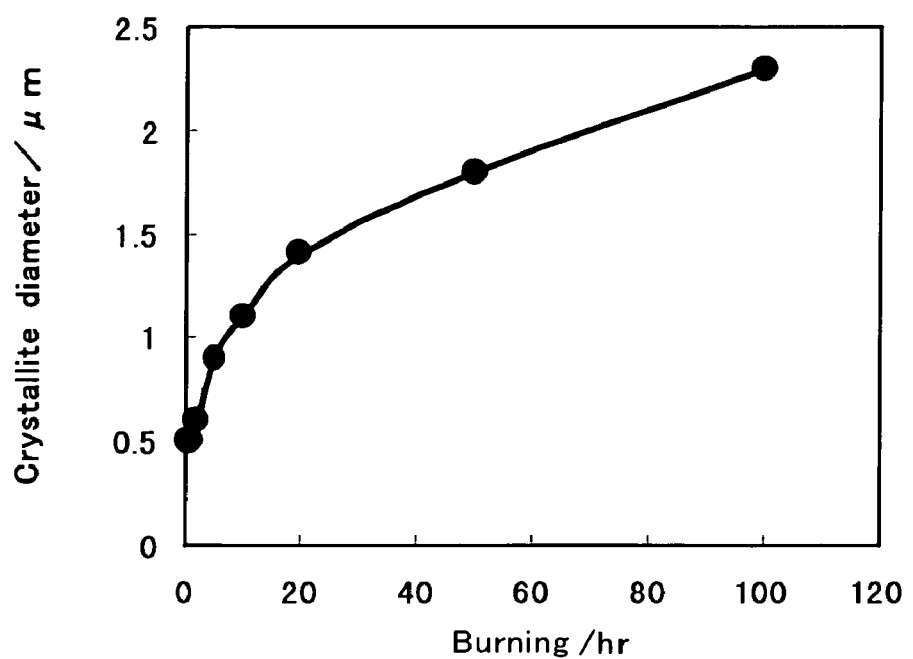
FIG. 2 is a figure a showing characteristic of an average crystallite diameter of a sintered compact prepared by subjecting a preliminary sintered compact to HIP processing at 1450 deg C. for 0.5 to 100 hours in 147 MPa Ar.
Figure 3:
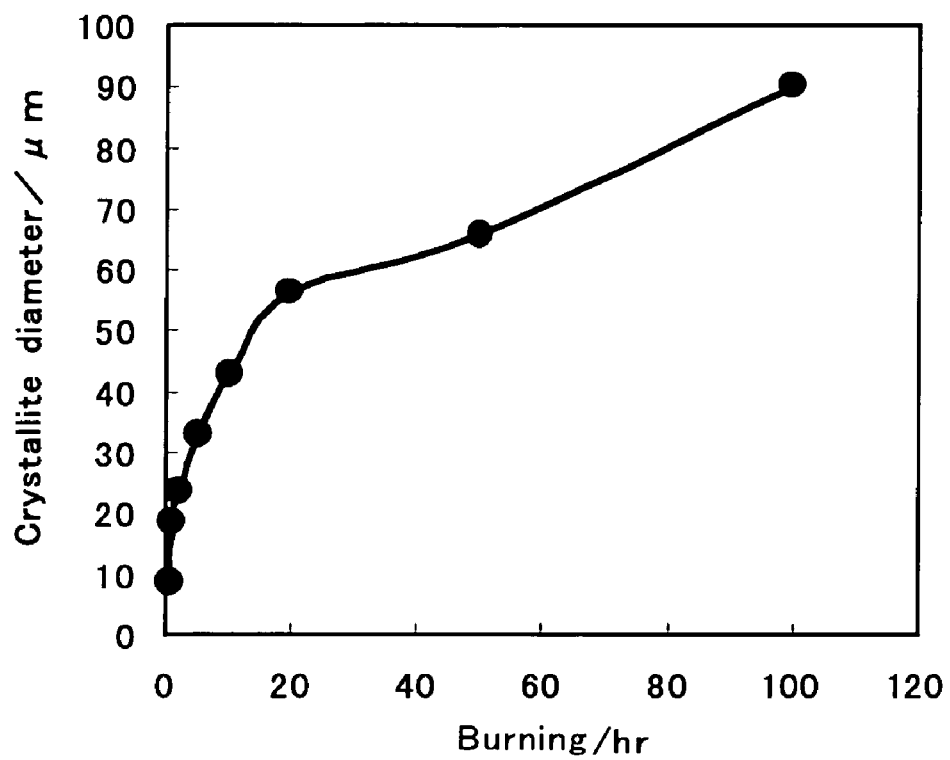
FIG. 3 is a figure a showing characteristic of an average crystallite diameter of a sintered compact prepared by subjecting a preliminary sintered compact to HIP processing at 1800 deg C. for 0.5 to 100 hours in 147 MPa Ar.

The presintered compact was processed by HIP. HIP was operated, for example, in Ar atmosphere at 147 MPa (normally, 10 to 250 MPa,) in the temperature range from 1350 to 1850 deg C., and for a time range from 1 to 100 hours. The temperature-rising rate was, for example, adjusted to 500 deg C./hr and a temperature-dropping rate was, for example, 200 deg C./hr. The average crystallite diameter of the obtained sintered compact was shown in FIG. 1 to FIG. 3. The average crystallite diameter increased to 10 or larger micrometers by HIP at 1720 or higher deg C. and the average crystallite diameter by HIP at 1400 or lower deg C. was 0.6 or smaller micrometers. Therefore, to obtain the sintered compact having the average crystallite diameter of 0.9 to 9 μm, the HIP temperature ranges preferably from 1450 to 1700 deg C. Obtaining the average crystallite diameter of 0.9 or larger micrometers at 1450 deg C. requires the HIP time of 5 or longer hours and the HIP time is preferably 5 or longer hours, for example, 100 or shorter hours.

During the process of HIP, impurities are in solid solution state in crystallines and pores disappear. On the other hand, when HIP temperature is set to 1700 or lower deg C., the average crystallite diameter becomes 9 or smaller micrometers. The sintered compact after HIP showed dark gray color and the inventors presumed that this coloration was caused by reduction of YAG by presintering and HIP.

Annealing

The HIP sintered compact was annealed by replacing the atmosphere to the oxygen-containing atmosphere such as Ar—$O_2$ following HIP in an HIP furnace. Following the cooling of the HIP sintered compact, heating may be carried out for annealing. The temperature for annealing is up to the HIP temperature (the maximum temperature for HIP), and preferably the temperature is lowered, for example, at least by 50 deg C. than the HIP temperature. The preferable annealing temperature is from 1100 deg C. up to the temperature lowered than the HIP temperature by 50 deg C. Of the atmosphere at annealing, the oxygen partial pressure is preferably 900 or higher KPa and the full pressure is preferably 4.5 or higher MPa. On the other hand, an oxygen concentration of the atmosphere is preferably at least 1 or higher volume percent. An annealing temperature is defined as the temperature at which the temperature is kept constant in the annealing process, and an annealing time is defined as the time in which the temperature is kept constant in the time. The annealing time ranges preferably from 30 minutes to 100 hours, and in the examples, 3 hours was assigned.

Annealing operated in the pressurized oxygen-containing atmosphere made the sintered compact colorless and clear through reoxidization and the light loss coefficient largely reduced to 0.02 or smaller $cm^{-1}$ and, also the transmitting wave front distortion reduced to 0.05 or smaller $\lambda$ $cm^{-1}$.

When the annealing temperature is defined as the HIP temperature or lower, the average crystallite diameter in annealing slightly increased. Particularly, when the annealing temperature is lowered at least 50 deg C. from the HIP temperature, no increase in the average crystallite diameter in annealing was observed. Annealing at the temperature higher than the HIP temperature caused grain growth of the sintered compact, the increase in the light loss and the transmitting wave front distortion, and reduction of strength of the sintered compact.

It is presumed that a gas such as Ar is in the solid solution state in the crystallite of the sintered compact in after HIP. It is also presumed that the gas being once in the solid solution state is kept in the solid solution state unless a crystal lattice is loosened by heating. Annealing at a pressure prevented to separate gas being in the solid solution state in the crystallite and prevented to generate pores.

When the atmosphere is replaced from a reduced or neutral atmosphere to the oxygen-containing atmosphere and the sintered compact is heated, the impurities being in the solid solution state in the crystallite may precipitate in the grain boundary. For instance, whether the impurities continue to be in the solid solution state in the crystallite depends on a surrounding atmosphere. However, annealing at the pressurized atmosphere yielded the sintered compact having the small light loss coefficient and resulted in no observation of the light loss caused by precipitation of the impurities.

Evaluation

For the sintered compact after annealing, measurements were carried out for the average crystallite diameter, the light loss coefficient, the transmitting wave front distortion, and processibility of the sintered compact.

Average Crystallite Diameter

The average crystallite diameter was measured according to Journal of American Ceramic Society 55 (2): 109 (1972.) After a surface of the obtained sintered compact was made flat by using a surface grinder, mirror grinding was operated by using 6-micrometer, 3-micrometer, and 1-micrometer diamond slurries. The sample subjected to mirror grinding was subjected to heat processing at 1300 deg C. for 2 hours in, for example, air to cause intergranular corrosion. A surface photograph of this sample was taken by using SEM or an optical microscope and, on this photograph, 5 lines were drawn randomly. A distance (L mm) from the grain boundary to the grain boundary, which were present in both ends of each line, and number N of grains presented between them were measured and counted, respectively. The average crystallite diameter (micrometer) was calculated as an average value of 5 values calculated after the following formula. Each grain after HIP has a clear crystal face and composed of a single crystal and, thus, a grain diameter is regarded as the crystallite diameter.

Average Crystallite Diameter=1.56×1000×L/N/Magnification

Light Loss Coefficient

Figure 4:
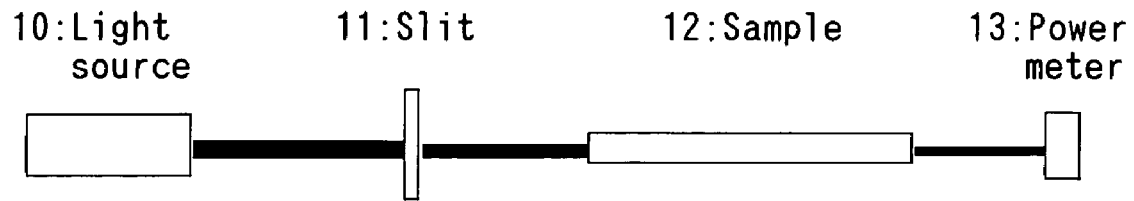
FIG. 4 shows a system of measurement of a light loss coefficient.

FIG. 4 shows a measurement apparatus of the light loss coefficient. A laser light arrived from a light source 10 (YAG laser or He-Ne laser) is made in a parallel light by using a lens, which is not illustrated, and slit 11, passes through sample 12, and is received by power meter 13 made by using a photodiode. The known intensity of the received light has been influenced by reflection and scattering on the surface of the sample and the light loss in an inside of the sample.

Then, 2 samples were used having thicknesses of 0.2 mm (for correction of influence of reflection and scattering on the surface) and 10 cm (for measurement of the light loss in the inside of the sintered compact.) Of both the ends of each samples parallelism degree (an error from a state of perfect parallelism) is defined as 30 or less seconds and a flatness made by grinding is defined as λ/10 or smaller (λ means a measured wavelength,) and a surface roughness (Ra) is defined as 0.5 or smaller nm. For measurement of the light loss coefficient, a 1.06 μm ray of the YAG laser was used a the light source and use of a 633 nm He-Ne laser light provided an equal quality result.

Using the thinner sample, the light loss α on the surface of the sample was calculated from $I'/I_o=(1-\alpha)^2$. Next, using the thicker sample, the light loss β in the inside of the sintered compact was calculated from $$I/I_o=(1-\alpha)^2 \exp(-\beta L)/\{1-\alpha^2 \exp(-2\beta L)\}.$$

$I_o$ is intensity of an incident light, I' and I are intensity of an transmitted light, L is the thickness of the sample. The light loss in the inside of the sintered compact is caused mainly by scattering through pores and impurities.

Transmitting Wave Front Distortion

Transmitting wave front distortion was measured for the sample, which was used for measurement of light loss coefficient, with a 10 cm or larger thickness by using a Fizeau interferometer (ZYGO corp. made model GPI-XP.)

Processibility of the Sintered Compact

Following both faces of 40×12 mm of the sintered compact sample of a 40×12×0.5 mm size were subjected to mirror grinding, cut six times in a 40 mm length direction in a speed of 20 mm/min by using a dicer to measure number of chippings with a length or width exceeding 0.2 mm. The number of chippings was assigned to an index of processibility.

Result

For the YAG sample, Table 1 shows the effect of annealing condition and Table 2 shows the effect of HIP condition. As the sample other than YAG, the samples prepared were those: sample 41 in which 50 mol % of yttrium chloride was replaced to gadolinium chloride, sample 42 in which yttrium chloride was replaced to erbium chloride, sample 43 in which yttrium chloride was replaced to lutetium chloride. Table 3 shows the results of the samples other than YAG. YAG may be added with Nd, Er, Cr, Tm, Ho, and Yb, and aluminum may be replaced by Ga and the like for use.

From Table 1, it can be known that a preferable annealing atmosphere has 4.5 or higher MPa full pressure (preferably 250 or lower MPa), and that the oxygen partial pressure having at least 1 or larger volume percent, 900 or higher KPa, and the full or lower pressure. It can be known that a preferable annealing temperature is 1000 or higher deg C., preferably 1100 or higher deg C., and the HIP temperature or lower, preferably the temperature lowered for at least 50 deg C. than the HIP temperature, for example, 1100 to 1550 deg C.

From Table 2, it can be known that the light loss coefficient and the transmitting wave front distortion decrease in 0.9 to 9 μm, particularly 1 to 5 μm of the average crystallite diameter. When the average crystallite diameter exceeds 10 μm, the transmitting wave front distortion increases and, when is 30 μm or above, the transmitting wave front distortion decreases again. And, processibility lowered in accordance with the increase in the average crystallite diameter.

From Table 3, it can be known that the same results are obtained from the sample other than YAG.

TABLE 1

Effect of annealing condition

| Unit | Pressure ×98 KPa | Gas Composition $O_2$/Ar | Annealing condition °C. × hr | Average crystallite diameter μm | Light loss coefficient 1/cm | Transmitting wave front distortion 1/cm |
|---|---|---|---|---|---|---|
| Sample 1 | 50 | 20/80 | 1300 × 3 | 2.3 | 0.001 | 0.008 λ |
| Sample 2 | 200 | 20/80 | 1600 × 3 | 2.5 | 0.0008 | 0.005 λ |
| Sample 3 | 500 | 20/80 | 1300 × 3 | 2.3 | 0.0004 | 0.006 λ |
| Sample 4 | 1000 | 20/80 | 1300 × 3 | 2.3 | 0.0007 | 0.007 λ |
| Sample 5 | 1500 | 20/80 | 1300 × 3 | 2.3 | 0.0002 | 0.005 λ |
| Sample 6 | 200 | 20/80 | 1550 × 3 | 2.3 | 0.0008 | 0.005 λ |
| Sample 7 | 2000 | 20/80 | 1100 × 3 | 2.3 | 0.0002 | 0.005 λ |
| Sample 8 | 1000 | 1/99 | 1300 × 3 | 2.3 | 0.0007 | 0.007 λ |
| Sample 9 | 1000 | 20/80 | 1300 × 1 | 2.3 | 0.001 | 0.008 λ |
| Sample 10 | in air | air | 1300 × 3 | 2.3 | 0.006 | 0.089 λ |
| Sample 11 | 20 | 20/80 | 1500 × 3 | 2.3 | 0.005 | 0.090 λ |
| Sample 12 | 40 | 20/80 | 1600 × 3 | 2.6 | 0.003 | 0.012 λ |
| Sample 13 | 1000 | Ar | 1600 × 3 | 2.4 | >1 | |
| Sample 14 | 1000 | 20/80 | 1750 × 3 | 15.2 | 0.0021 | 0.082 λ |

*Samples 10 to 14 are comparative examples.
*Sample composition is of YAG and measurement wavelength is 1.06 μm (ditto.)
*Preliminary sintering was operated at 1500 deg C., in a vacuum for 2 hours; HIP was operated at 1600 deg C., at 147 MPa for 5 hours
*Annealing time was 3 hours.

TABLE 2

Effect of HIP condition

| Unit | HIP condition ° C. × hr | Average crystallite diameter μm | Light loss coefficient 1/cm | Transmitting wave front distortion 1/cm | Processability number |
|---|---|---|---|---|---|
| Sample 21 | 1450 × 5 | 0.9 | 0.0011 | 0.006 λ | 0 |
| Sample 22 | 1500 × 5 | 1 | 0.0005 | 0.007 λ | 0 |
| Sample 23 | 1550 × 5 | 1.5 | 0.0007 | 0.008 λ | 0 |
| Sample 4 | 1600 × 5 | 2.3 | 0.0007 | 0.007 λ | 0 |
| Sample 24 | 1650 × 5 | 4.2 | 0.0004 | 0.006 λ | 0 |
| Sample 25 | 1700 × 5 | 8.9 | 0.0007 | 0.016 λ | 0 |
| Sample 26 | 1450 × 10 | 1.1 | 0.0012 | 0.009 λ | 0 |
| Sample 27 | 1450 × 20 | 1.4 | 0.0014 | 0.008 λ | 0 |
| Sample 28 | 1450 × 50 | 1.8 | 0.0009 | 0.008 λ | 0 |
| Sample 29 | 1450 × 100 | 2.3 | 0.0009 | 0.006 λ | 0 |
| Sample 30 | 1800 × 0.5 | 8.6 | 0.0004 | 0.026 λ | 0 |
| Sample 31 | 1350 × 5 | 0.5 | >1 | — | 0 |
| Sample 32 | 1400 × 5 | 0.6 | >1 | — | 0 |
| Sample 33 | 1720 × 5 | 10.9 | 0.0002 | 0.082 λ | 0 |
| Sample 34 | 1750 × 5 | 18.5 | 0.0008 | 0.075 λ | 4 |
| Sample 35 | 1800 × 5 | 33.1 | 0.0008 | 0.012 λ | 12 |
| Sample 36 | 1800 × 10 | 42.9 | 0.0005 | 0.009 λ | 29 |
| Sample 37 | 1800 × 50 | 65.9 | 0.0017 | 0.010 λ | many |
| Sample 38 | 1800 × 100 | 90.1 | 0.0008 | 0.020 λ | many |

*Samples 31 to 38 are comparative examples.
*Preliminary sintering was operated at 1500 deg C., in a vacuum for 2 hours; annealing condition was 98 MPa, 20 volume percent O$_2$/80 volume percent Ar, 1300 deg C., and 3 hours.
*HIP atmosphere was 147 MPa Ar.

TABLE 3

(samples other than YAG)

| Unit | HIP condition ° C. × hr | Average crystallite diameter μm | Light loss coefficient 1/cm | Transmitting wave front distortion 1/cm | Processability number |
|---|---|---|---|---|---|
| Sample 41 Y$_{1.5}$Gd$_{1.5}$Al$_5$O$_{12}$ | 1700 × 5 | 8.5 | 0.0002 | 0.012 λ | 0 |
| Sample 42 Er$_3$Al$_5$O$_{12}$ | 1700 × 5 | 8.8 | 0.0002 | 0.008 λ | 0 |
| Sample 43 Lu$_3$Al$_5$O$_{12}$ | 1700 × 5 | 7.8 | 0.0002 | 0.005 λ | 0 |

*Preliminary sintering was operated at 1500 deg C., in a vacuum for 2 hours; annealing condition was 98 MPa, 20 volume percent O$_2$/80 volume percent Ar, 1300 deg C., and 3 hours.

The invention claimed is:

1. A rare earth garnet sintered compact, annealed in a pressurized oxygen-containing atmosphere after hot isostatic pressing (HIP,) having:
    an average crystallite diameter ranging from 0.9 to 9 μm;
    a light loss coefficient of 0.002 or smaller cm$^{-1}$; and
    a transmitting wave front distortion of 0.05 or smaller λ cm$^{-1}$.

2. A method for manufacturing a rare earth garnet sintered compact comprising:
    a step for presintering a molded compact of a rare earth garnet;
    a step for pressing the obtained presintered compact with an hot isostatic pressing (HIP) into HIP sintered compact; and
    a step for annealing the obtained HIP sintered compact in the oxygen-containing atmosphere at a 4.5 or higher MPa pressure into a sintered compact having an average crystallite diameter ranging from 0.9 to 9 μm, a light loss coefficient of 0.002 or smaller cm$^{-1}$, and a transmitting wave front distortion of 0.05 or smaller λ cm$^{-1}$.

3. A method for manufacturing the rare earth garnet sintered compact according to claim 2 wherein:
    in annealing, an oxygen partial pressure of the oxygen-containing atmosphere is 900 or higher KPa and an annealing temperature is an HIP temperature or lower.

4. A method for manufacturing the rare earth garnet sintered compact according to claim 3 wherein:
    the annealing temperature is 1100 to 1600 deg C. and a full pressure of the oxygen-containing atmosphere is 4.5 or higher MPa in annealing.

* * * * *

UNITED STATES PATENT AND TRADEMARK OFFICE
CERTIFICATE OF CORRECTION

PATENT NO. : 7,253,129 B2 Page 1 of 1
APPLICATION NO. : 10/525162
DATED : August 7, 2007
INVENTOR(S) : Takagimi et al.

It is certified that error appears in the above-identified patent and that said Letters Patent is hereby corrected as shown below:

<u>Title Page of the Patent</u>, See Item (54) the Title:
"RARE EARTH GARMET SINTERED COMPACT" should read
-- RARE EARTH GARNET SINTERED COMPACT --

Signed and Sealed this

Fourth Day of December, 2007

JON W. DUDAS
*Director of the United States Patent and Trademark Office*